US009086157B2

United States Patent
Rowe et al.

(10) Patent No.: US 9,086,157 B2
(45) Date of Patent: Jul. 21, 2015

(54) HIGH-PRESSURE FACE SEAL (75) Inventors: Gordon D. Rowe, Southington, CT (US); John C. Winchester, Trumbull, CT (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 662 days.

(21) Appl. No.: 13/336,996

(22) Filed: Dec. 23, 2011

(65) Prior Publication Data

US 2012/0193565 A1   Aug. 2, 2012

Related U.S. Application Data (60) Provisional application No. 61/438,667, filed on Feb. 2, 2011.

(51) Int. Cl.
*F16K 1/36* (2006.01)
*F16K 11/07* (2006.01)

(52) U.S. Cl.
CPC .............. *F16K 1/36* (2013.01); *F16K 11/0712* (2013.01)

(58) Field of Classification Search
CPC .............. F16K 1/34; F16K 1/42; F16K 1/46; F16K 25/00; F16K 1/36
USPC .................. 251/318, 333, 334, 356, 358, 367
See application file for complete search history.

(56) References Cited

U.S. PATENT DOCUMENTS

| | | | |
|---|---|---|---|
| 1,627,299 A * | 5/1927 | Gemmel | 251/357 |
| 2,191,232 A | 2/1940 | Heinen | |
| 2,668,068 A | 2/1954 | Bredemeier | |
| 3,186,681 A | 6/1965 | Lowrey | |
| 4,070,005 A | 1/1978 | McJones | |
| 4,124,194 A | 11/1978 | Alvarez et al. | |
| 4,198,063 A | 4/1980 | Shimizu et al. | |
| 4,228,987 A * | 10/1980 | Potter | 251/210 |
| 4,249,717 A * | 2/1981 | Thompson | 251/210 |
| 4,408,722 A | 10/1983 | Frelund | |
| 4,669,702 A * | 6/1987 | Tripp | 251/210 |
| 4,750,709 A * | 6/1988 | Kolenc et al. | 251/335.2 |
| 4,763,562 A | 8/1988 | Haytayan | |
| 5,116,020 A * | 5/1992 | Peng et al. | 251/129.17 |
| 6,666,458 B2 | 12/2003 | Coates | |
| 7,293,579 B2 | 11/2007 | Aardema et al. | |
| 7,357,151 B2 * | 4/2008 | Lonnes | 137/509 |
| 7,425,003 B2 | 9/2008 | Anderson et al. | |
| 7,802,588 B2 | 9/2010 | Doutt | |

* cited by examiner

*Primary Examiner* — Marina Tietjen
(74) *Attorney, Agent, or Firm* — Renner, Otto, Boisselle & Sklar, LLP (57) ABSTRACT

Described is a valve face seal assembly. The assembly includes a moveable member, such as a poppet, and a seal having a sealing portion carried by the moveable member. A seat opposite the sealing portion of the seal has a transaxial seat face and an axial seat face extending axially toward the moveable member at an obtuse angle from the transaxial seat face. When the seal of the moveable member is brought into contact with the seat, a seal is formed with the transaxial seat face and with the axial seat face.

18 Claims, 8 Drawing Sheets

HIGH-PRESSURE FACE SEAL

RELATED APPLICATIONS

This application claims the benefit of U.S. Provisional Application No. 61/438,667 filed Feb. 2, 2011, which is hereby incorporated herein by reference in its entirety.

FIELD OF INVENTION

The present invention relates generally to face sealing assemblies and associated components, and more particularly to such a sealing assembly for use with high-pressure applications.

BACKGROUND

Face seals have been used to eliminate leakage that often arises from improper use or other deficiencies of fittings that rely on metal-to-metal sealing. A typical face seal fitting includes a fitting body having a center bore that opens to a transverse sealing face. The outer periphery of the fitting body often is provided with external threads while the sealing face has formed therein an annular groove for containing an annular seal. The annular seal usually has an axial dimension greater than the depth of the groove so as to project from the sealing face. Accordingly, the annular seal will be compressed in the groove upon being engaged by a confronting sealing surface of a mating part.

Face seals are commonly used in various types of valves in applications for controlling and directing the flow of liquids or gases from one or more inlet ports to a common outlet port. Such valves are commonly constructed with an axially movable poppet located inside a valve body with a cylindrical bore. A biasing shaft is connected to the poppet to transmit a bias force to the poppet. Common methods for applying the bias force to the shaft include springs, pneumatic or hydraulic cylinders, and solenoid coils.

Elastomeric and thermoplastic materials have been found to be suitable seal materials for both low and high fluid pressure applications, including those in the dirty valve applications, such as in the energy, oil, and gas industries. While elastomeric valve seats are adequate for many applications, they may be less resistant to abrasion than thermoplastic materials and thus more prone to damage from contaminants in the fluids and wear from repeated valve cycling. Elastomeric materials may also be more likely than thermoplastic materials to suffer from degradation caused by chemical attack or extreme low or high temperatures. On the other hand, thermoplastic materials may be less resilient than elastomeric materials, which can make them less suitable for proving a reliable dynamic seal. In either case, when used in high pressure dirty valve applications, debris can break down the seal over time.

Thus, while material selection may be useful in improving the performance and durability of seals in certain applications, it is desirable to improve the functionality of face seal assemblies without modifying the seal material.

SUMMARY OF INVENTION

The present invention is directed to a face seal assembly that is suitable for high-pressure, low pressure and dirty valve applications. More particularly, the invention is directed at a face seal with a seat having a transaxial seat face and an axially extending seat face forming an obtuse angle with the transaxial seat face. The seal and seat are dimensioned such that compressing the seal against the seat causes sealing engagement of the seal with both the transaxial seat face and the axial seat face. The presence of sealing engagement of multiple surfaces makes the seal assembly more resistant to debris and more tolerant of degradation of the seal component.

An aspect of the present invention includes a valve assembly for controlling the flow of fluid. The valve assembly includes a moveable member; a seal carried by the moveable member, the seal having a main body and a sealing portion; and a valve seat disposed opposite the moveable member, the valve seat having a transaxial seat face and an axial seat face extending axially from and forming an obtuse angle with the transaxial seat face. The seal is axially spaced from the valve seat when the moveable member is in a first position and sealingly engages the transaxial seat face and the axial seat face of the valve seat when the moveable member is in a second position.

According to another aspect, the sealing portion may have a generally rectangular cross section.

According to another aspect, the sealing portion may have a surface that is generally parallel to the transaxial seat face.

According to another aspect, the sealing portion may have a surface that is generally perpendicular to the transaxial seat face.

According to another aspect, the moveable member may include a groove adapted to receive the seal.

According to another aspect, the valve may further include a retaining member adapted to prevent the seal and sealing face of the moveable member from disengaging.

According to another aspect, the retaining member and the moveable member may together form a groove in which the seal is retained.

According to another aspect, at least part of the retaining member and at least part of the moveable member may be disposed on opposite sides of the seal.

According to another aspect, the retaining member may be coupled to the moveable member.

According to another aspect, tightening the retaining member with respect to the moveable member may compress the seal.

According to another aspect, the retaining member may be metal.

According to another aspect, the seal may include an inner diameter face having a wedge-shaped surface. In addition, the valve may further include a retaining member having a wedge-shaped portion opposite wedge-shaped surface of the seal, wherein the seal may be retained in a groove between the retaining member and the moveable member.

According to another aspect, the seal may include an outer diameter face having a ramp-shaped surface.

According to another aspect, at least part of the seal may be frustoconical.

According to another aspect, the valve may further include a retaining member having a surface adapted to mate with the frustoconical part of the seal.

According to another aspect, the seal may be formed of a filled or unfilled polymeric material.

According to another aspect, the valve seat may be metal.

According to another aspect, the obtuse angle may range from about 95 degrees to about 135 degrees.

According to another aspect, the obtuse angle may range from about 100 to about 120 degrees.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION

Throughout this disclosure, reference numerals are used to designate elements in the figures referred to in the text. Analogous elements between different embodiments use reference numerals incremented or decremented by multiples of 100 in order to aid in understanding. Such elements may be functionally similar or equivalent to each other, and may share similar or identical physical geometry, but need not do so. Further, some elements common to two or more figures and described elsewhere in the text may be omitted from another figure and/or description for clarity and brevity, but it is understood that this disclosure contemplates that features from one embodiment may be present in another without being explicitly referred to in the text or shown in a figure.

For illustrative purposes, the precepts of a valve assembly in accordance with the present invention are described in connection with a three-way valve and a relief valve. It will be appreciated, however, that aspects of the present invention will find application in other valve configurations.

Figure 1A:
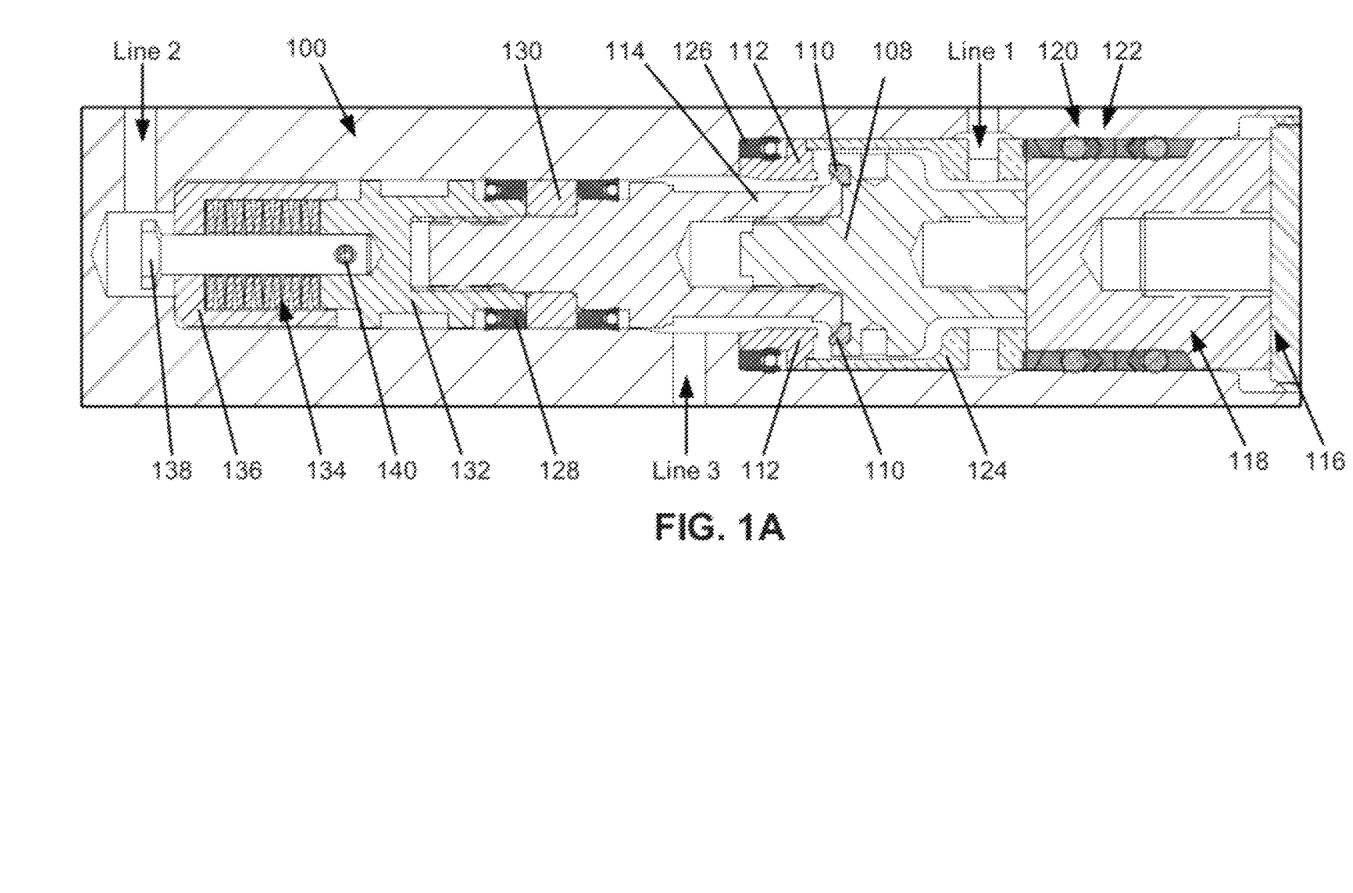
FIGS. 1A-B are cross-sectional views of an exemplary three-way valve with a sealing assembly in an open and closed position.
Figure 1B:
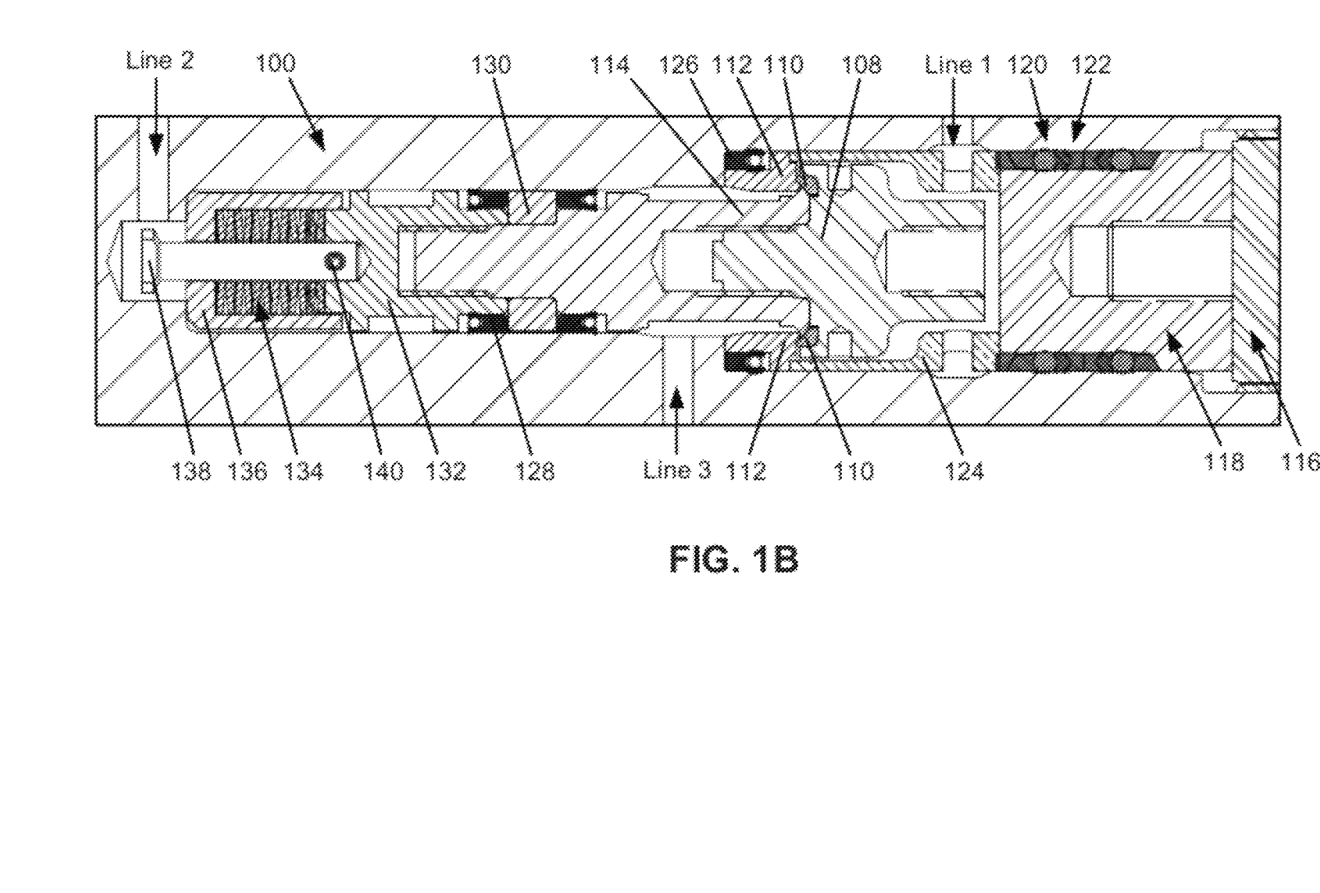

Turning initially to FIGS. 1A-B, an exemplary three-way valve 100 in accordance with the present invention is disclosed in open and closed states. The exemplary valve 100 includes three ports: line 1, line 2 and line 3. The valve 100 includes a sealing assembly, which includes a moveable member 108, which may be a poppet, a seal 110, which may be an annual seal, a valve seat 112, and a retaining member 114, such as a retaining nut, which may be coupled to the moveable member 108. As shown in FIGS. 1A-B, the retaining member 114 may be threadably engaged with the moveable member 108 and may be adapted to prevent the seal 110 and moveable member 108 from disengaging. The retaining member 114 may also provide an overcompression stop.

When the sealing assembly is open, a fluid path exists between line 1 and line 3. A retainer 116, seal carrier 118, chevron seal 120 and o-rings 122, which energize the chevron seal 120, function to prevent fluid from escaping the valve housing. A sleeve 124 surrounds the moveable member 108 and seal 110 and mates with the seat 112. Adjacent the seat 112 and retainer 114 are static axial seal 126 and dynamic axial seals 128, respectively. A spacer 130 separates the dynamic axial seals 128. Nut 132 is threadably connected to the retainer 114 such that the nut 132 and the retainer 114 abut opposite sides of the spacer 130. Finally, a disk spring 134 is housed within a spring stop 136, which interacts with a retaining pin 138 having a spring pin 140.

The three-way valve 100 is a normally open valve, meaning that a fluid communication path exists between line 1 and line 3 when line 1, line 2 and line 3 are all unpressurized. Pressurizing line 1 causes the moveable member 108 to move axially toward line 2, which causes the seal 110 to engage the seat 112, thereby closing the fluid pathway between line 1 and line 3. Depressurizing line 1 thus causes the moveable member 108 to move axially away from the seat 112, which causes the seal 110 to disengage from the seat 112. As the seal 110 and the seat 112 disengage, a fluid passageway opens between line 1 and line 3. In addition, line 2 may be pressurized to ensure open communication between line 1 and line 3. Pressurizing line 2 applies force to the moveable member 108 in a direction opposite line 2 and toward the retainer 116. Consequently, pressurizing line 2 may cause the moveable member 108 to move axially away from the seat 112.

Turning next to FIGS. 2A-B and 3A-B, FIGS. 2A-B provide detailed cross-sectional views of the sealing assembly 101 of the valve of FIGS. 1A-B and FIGS. 3A-B provide detailed cross-sectional and plan views of the seal of FIGS. 1A-B. The seal 110 is carried by the moveable member 108, which has an end face 109. The seal 110 has a sealing portion 150 extending from a main body 151. Disposed opposite and spaced from the moveable member 108 is the valve seat 112, which has at least two surfaces on the side of the valve seat 112 opposite the seal 110. As shown, the valve seat 112 has a transaxially extending face 152, referred to herein as the transaxial seat face 152, and an axially extending face 154, referred to herein as the axial seat face 154. The transaxial seat face 152 and axial seat face 154 preferably form an obtuse angle. In one embodiment, the obtuse angle ranges from about 95 degrees to about 135 degrees. In one embodiment, obtuse angle ranges from about 100 to about 120 degrees. It should be understood by those of skill in the art that the angle shown in the Figures may be exaggerated to better highlight the features of the invention.

Figure 2A:
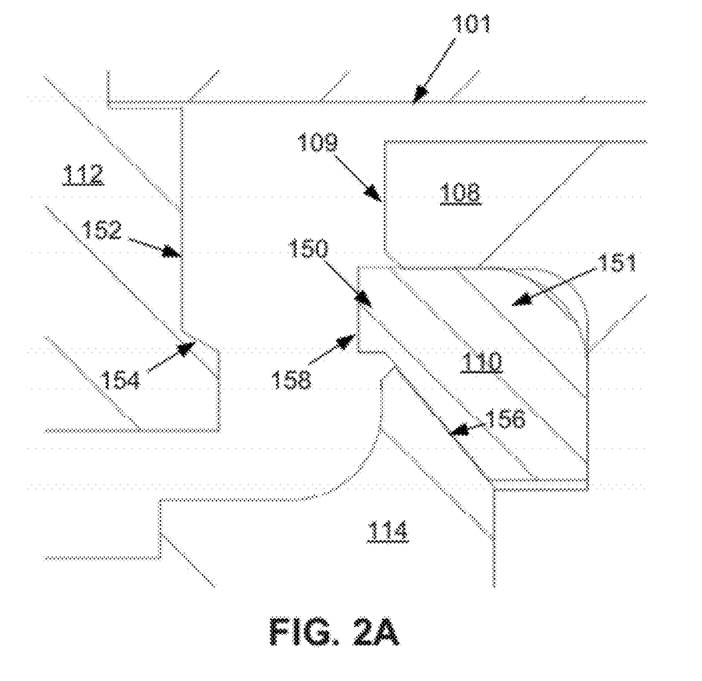
FIGS. 2A-B are detailed cross-sectional views of the sealing assembly of the valve of FIGS. 1A-B.
Figure 2B:
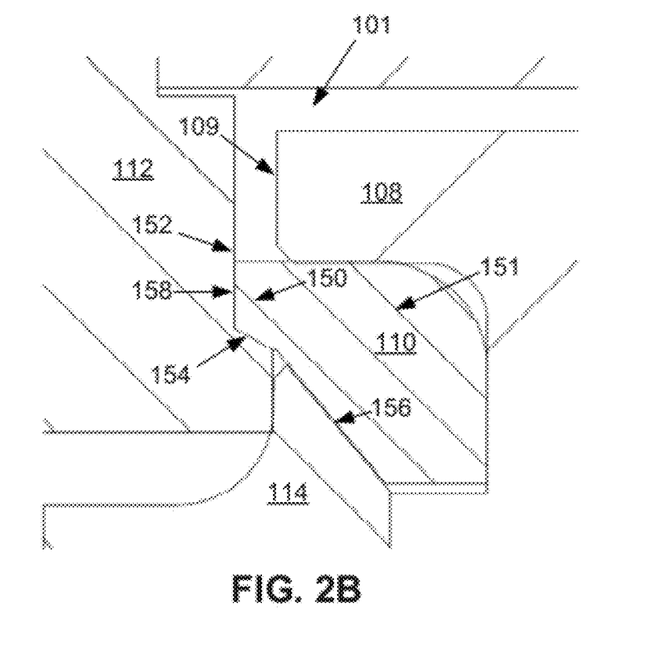
Figure 3A:
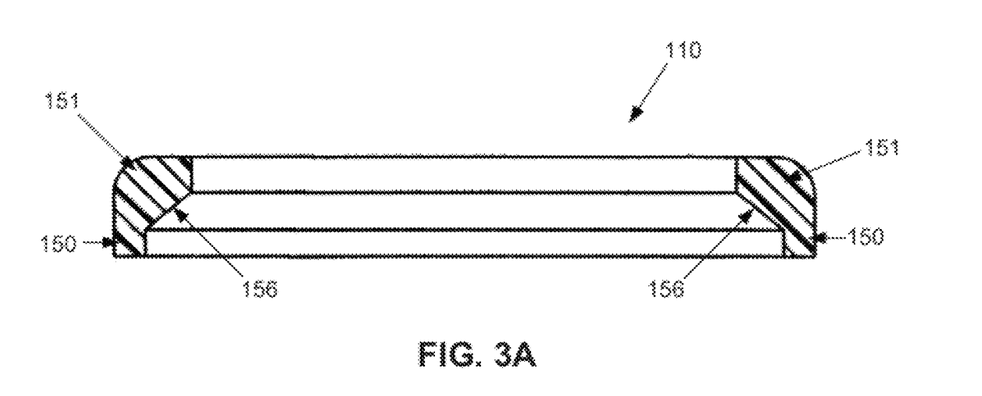
FIGS. 3A-B are detailed cross-sectional and plan views of the seal of FIGS. 1A-B and 2A-B.
Figure 3B:
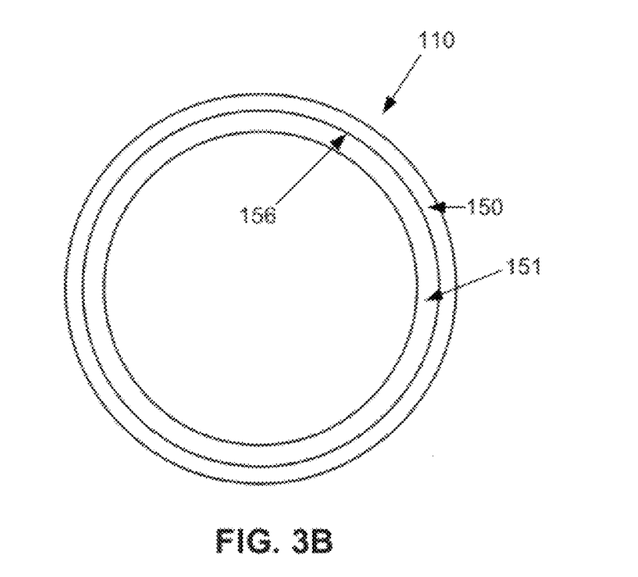

The sealing portion 150 is axially spaced from the valve seat 112 when the moveable member 108 is in a first position (FIG. 2A). The sealing portion 150 sealingly engages the transaxial seat face 152 and the axial seat face 154 of the valve seat 112 when the moveable member 108 is in a second position (FIG. 2B). Thus, when the moveable member 108 is caused to move toward the seat 112, such as when line 1 is pressurized, the seal 110 sealingly engages both the transaxial seat face 152 and the axial seat face 154. Specifically, the sealing portion 151 of the seal 110 sealingly engages the transaxial seat face 152 and the axial seat face 154.

In addition, the seal 110 may have an inner diameter face 156 and an outer diameter face 158, which is an end face in the configuration shown in FIGS. 2A-B. The inner diameter face 156 may be orientated at an angle with respect to the portion of the main body 151 adjacent the inner face 156 is wedge shaped, as shown in FIGS. 2A-B. The sealing portion 151 of the seal 110 may have a generally rectangular cross section with a seal end face 158 that is generally parallel to the transaxial seat face 152 and a surface that is generally perpendicular to the transaxial seat face 152.

The moveable member 108 may be adapted to carry the seal 110. Such adaptation may include a groove adapted to receive part of the seal 100, such as the main body 151. In this manner, the seal 110 may be moveable with the moveable body 108. In addition, part of each of the moveable member 108 and retaining member 114 may be disposed on opposite sides of the seal 110, as shown in FIGS. 2A-B. The retaining member 114 may be adapted to prevent the seal 110 and the moveable member 108 from disengaging. For example, tightening the retaining member with respect to the moveable member may compress the seal 110. In addition, the retaining member 114 may also be adapted to receive part of the seal 110. In one embodiment, the retaining member 114 and the moveable member 108 together may form a groove in which the seal 110 is retained. In addition, if the seal 110 has a wedge-shaped surface, the retaining member 114 may have an opposing wedge-shaped surface. It will be understood by those of skill in the art that the specific shape of the main body 151 and seal portion 150 of the seal 110 may vary, so long as the seal 110 is capable of sealingly engaging both a transaxial seat face 152 and axial seat face 154 extending at an obtuse angle from the transaxial seat face 152.

The seal 110 may be caused to deform as it is forced against the transaxial seat face 152 and/or the axial seat face 154. Accordingly, after the moveable member 108 moves from a first position to a second position, the sealing portion 150 may deform to a shape that less closely resembles a rectangle and more closely resembles a shape formed by the transaxial seat face 152 and axial seat face 154.

Figure 4A:
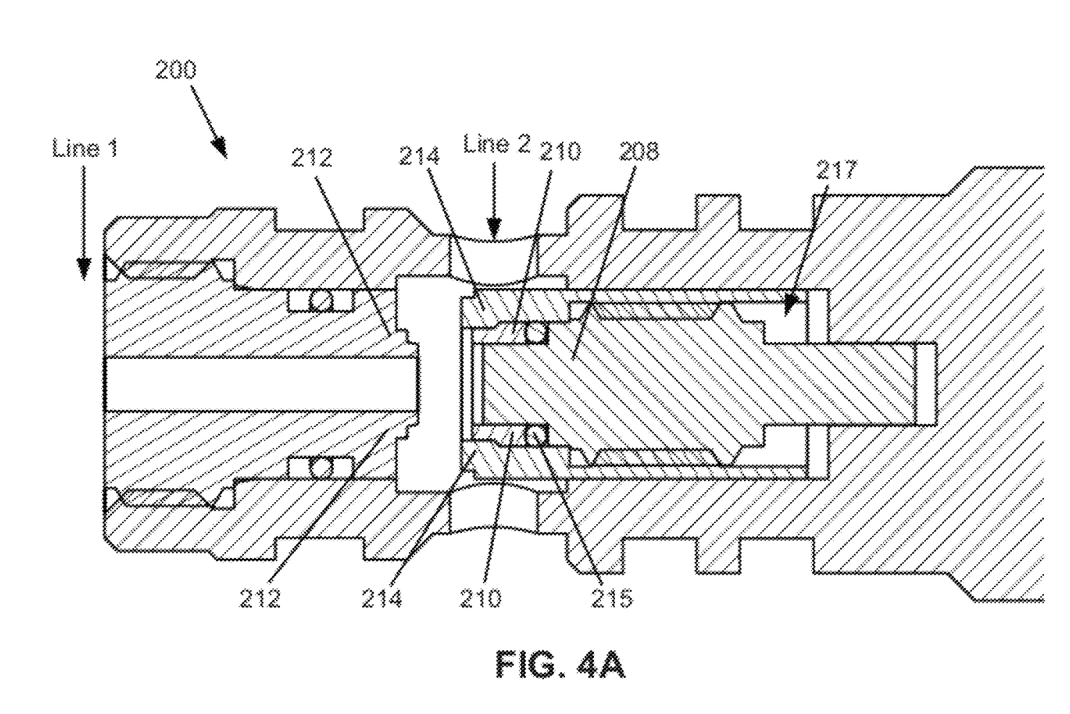
FIGS. 4A-B are cross-sectional views of an exemplary relief valve with a sealing assembly in an open and closed position.
Figure 4B:
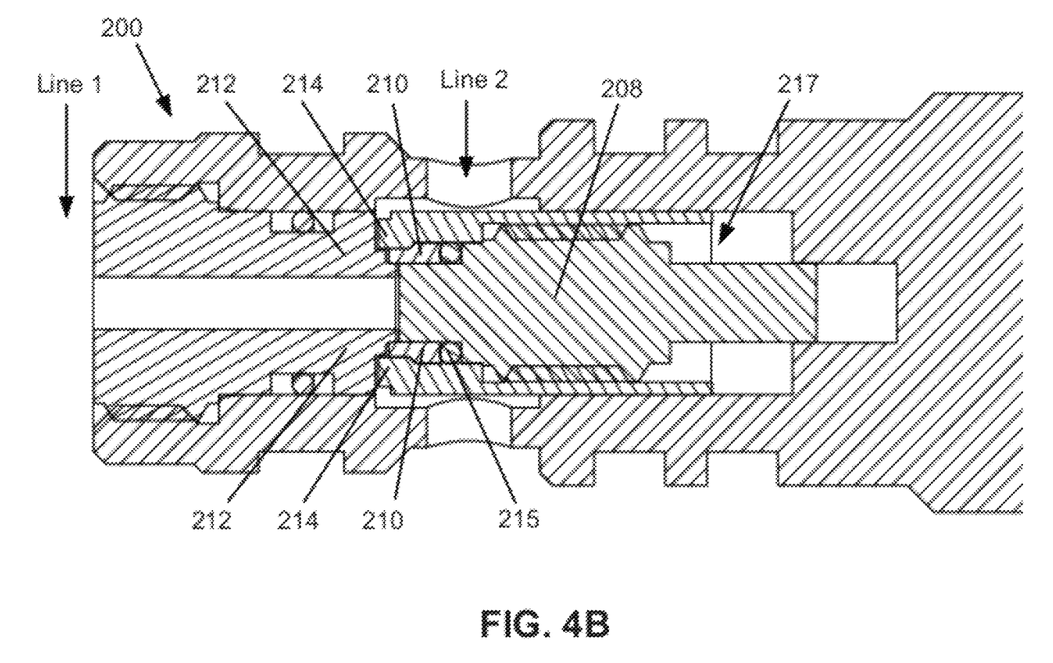

Turning next to FIGS. 4A-B, an exemplary relief valve 200 in accordance with the present invention is disclosed in open and closed states. The exemplary valve 200 includes two ports: line 1 and line 2. The valve 200 includes a sealing assembly, which includes a moveable member 208, which may be a poppet, a seal 210, which may be an annual seal, a valve seat 212, and a retaining member 214, such as a retaining nut, which may be coupled to the moveable member 208. As shown in FIGS. 4A-B, the retaining member 214 may be threadably engaged with the moveable member 208 and may be adapted to prevent the seal 210 and moveable member 208 from disengaging. The retaining member 214 may also provide an overcompression stop. The relief valve 200 also includes an o-ring 215 between the seal 210 and the moveable member 208.

The relief valve 200 includes a spring 217 that exerts force on the moveable member 208 in the direction of the valve seat 212. Thus, the force exerted on the moveable member 208 by the spring 217 causes the valve to close. In use, pressurizing line 1 sufficiently to overcome the force exerted on the moveable member 208 by the spring 217 causes the moveable member 208 to move axially away from the seat 212, which causes the seal 210 to disengage from the seat 212. As the seal 210 and the seat 212 disengage, a fluid passageway opens to line 2. When line 2 is depressurized, the spring 217 causes the moveable member 208 to move axially toward the seat 212, which causes the seal 210 to engage the seat 212, thereby closing the fluid pathway to line 2.

Turning next to FIGS. 5A-B and 6A-B, FIGS. 5A-B provide detailed cross-sectional views of the sealing assembly 201 of the valve of FIGS. 4A-B and FIGS. 6A-B provide detailed cross-sectional and plan views of the seal of FIGS. 4A-B. The seal 210 is carried by the moveable member 208, which has an end face 209. The seal 210 has a sealing portion 250 extending from a main body 251. Disposed opposite and spaced from the moveable member 208 is the valve seat 212, which has at least two surfaces. As shown, the valve seat 212 has a transaxially extending face 252, referred to herein as the transaxial seat face 252, and an axially extending face 254, referred to herein as the axial seat face 254. The transaxial seat face 252 and axial seat face 254 preferably form an obtuse angle. In one embodiment, the obtuse angle ranges from about 95 degrees to about 135 degrees. In one embodiment, obtuse angle ranges from about 100 to about 120 degrees. It should be understood by those of skill in the art that the angle shown in the Figures may be exaggerated to better highlight the features of the invention.

The sealing portion 250 is axially spaced from the valve seat 212 when the moveable member 208 is in a first position (FIG. 2A). The sealing portion 250 sealingly engages the transaxial seat face 252 and the axial seat face 254 of the valve seat 212 when the moveable member 208 is in a second position (FIG. 2B). Thus, when the moveable member 208 is caused to move toward the seat 112, such as when line 2 is depressurized, the seal 210 sealingly engages both the transaxial seat face 252 and the axial seat face 254. Specifically, the sealing portion 251 of the seal 210 sealingly engages the transaxial seat face 252 and the axial seat face 254.

Figure 5A:
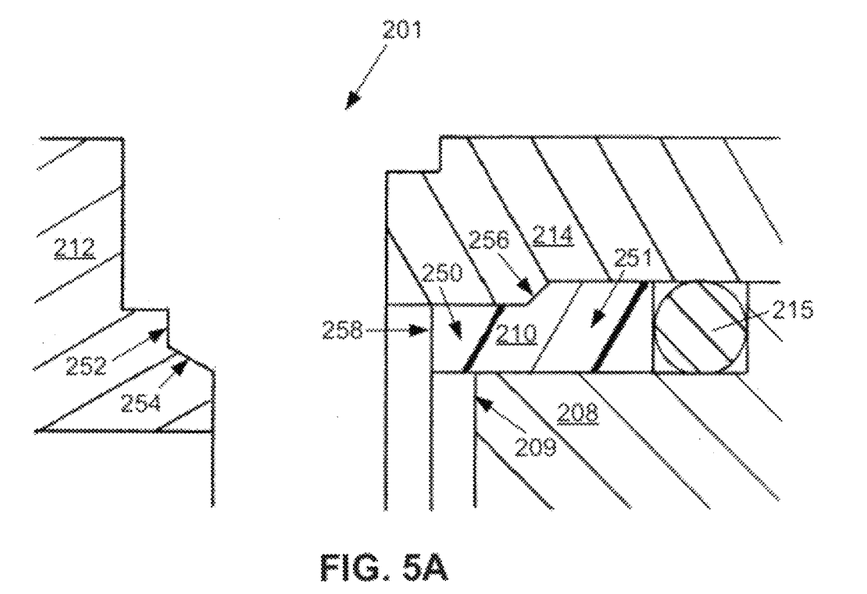
FIG. 5A-B are detailed cross-sectional views of the sealing assembly of the valve of FIGS. 4A-B.
Figure 5B:
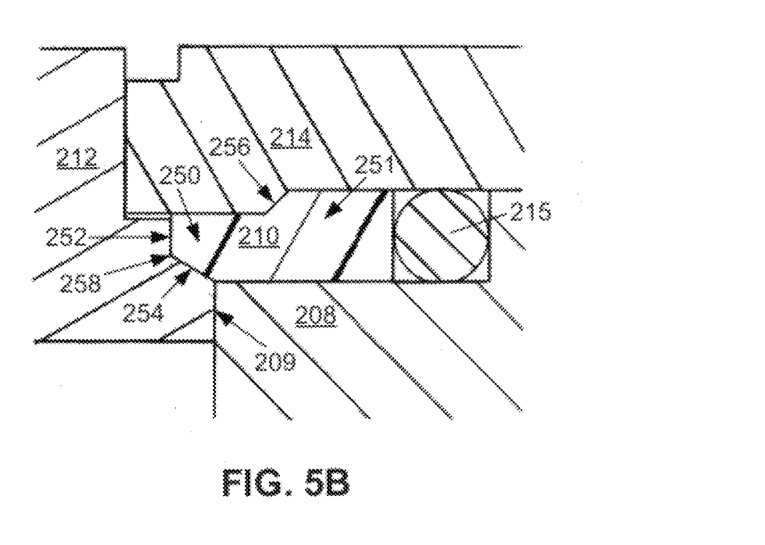
Figure 6A:
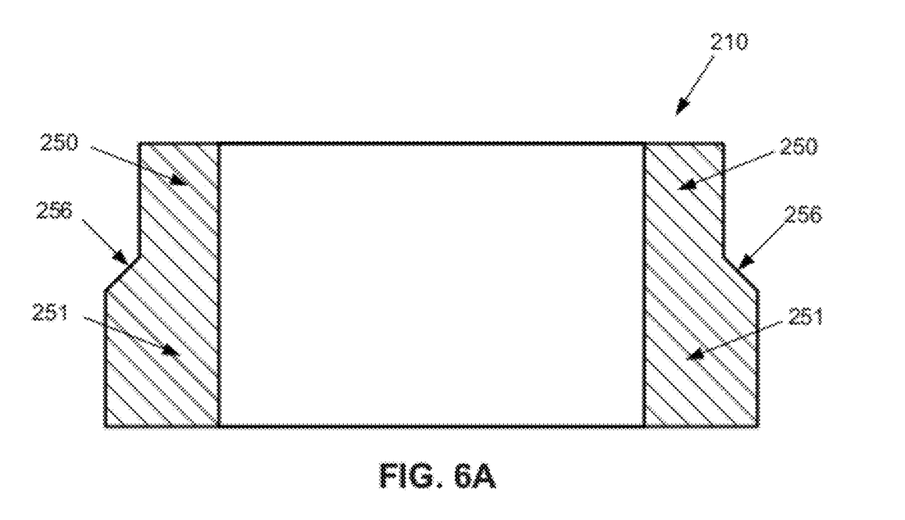
FIGS. 6A-B are detailed cross-sectional and plan views of the seal of FIGS. 4A-B and 5A-B.
Figure 6B:
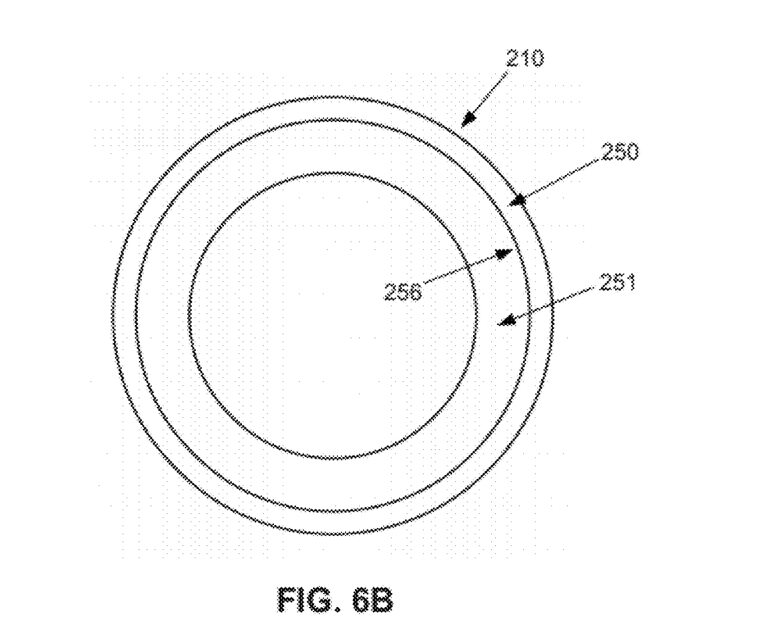

In addition, the seal 210 may have an outer diameter face surface 256 having a ramp shape, such as that shown in FIGS. 5A-B. In addition, at least part of the seal 210 may be frustoconical in shape. The sealing portion 151 of the seal 110 may have a generally rectangular cross section with a seal end face 258 that is generally parallel to the transaxial seat face 252 and a surface that is generally perpendicular to the transaxial seat face 252.

The moveable member 208 may be adapted to carry the seal 210. Such adaptation may include a groove adapted to receive part of the seal 200, such as the main body 251. In this manner, the seal 210 may be moveable with the moveable body 208. In addition, part of each of the moveable member 208 and retaining member 214 may be disposed on opposite sides of the seal 210, as shown in FIGS. 5A-B. The retaining member 214 may be adapted to prevent the seal 210 and the moveable member 208 from disengaging. For example, tightening the retaining member with respect to the moveable member may compress the seal 210. In addition, the retaining member 214 may also be adapted to receive part of the seal 210. In one embodiment, the retaining member 214 and the moveable member 108 together may form a groove in which the seal 210 is retained. In addition, if the seal 210 is, for example, partially frustoconical in shape, the retaining member 214 may have a surface adapted to mate with the frustoconical part of the seal, as shown in FIGS. 5A-B.

It will be understood by those of skill in the art that the specific shape of the main body 251 and seal portion 250 of the seal 210 may vary, so long as the seal 210 is capable of sealingly engaging both a transaxial seat face 252 and axial seat face 254 extending at an obtuse angle from the transaxial seat face 252.

The seal 210 may be caused to deform as it is forced against the transaxial seat face 252 and/or the axial seat face 254. Accordingly, after the moveable member 208 moves from a first position to a second position, the sealing portion 250 may deform to a shape that less closely resembles a rectangle and more closely resembles a shape formed by the transaxial seat face 252 and axial seat face 254.

It will be understood by those skilled in the art that the present invention is not limited to any specific valve design or configuration and may be applicable to low pressure and high pressure face seal applications, and various types of suitably associated valve constructions. In addition, those of ordinary skill in the art will also understand that the present invention is not limited to the use of any specific materials and that any suitable materials may be used.

With respect to the seal 110 and 210, it will be understood by those of ordinary skill in the art that materials commonly used in the art include polymeric materials, thermoplastic materials and combinations thereof. Examples of such materials include, but are not limited to, PEEK, PTFE, high-performance polyurethane, Silicone, Nylon, Polyoxymethylene (POM), UHMWPE Hydrogenated Nitrile Butadiene Rubber, EPDM rubber, or the like. Moreover, the elastomeric materials may be unfilled or filled with materials such as glass, carbon or other suitable materials.

With respect to the seat 112, it should be understood by those of ordinary skill in the art that while such polymeric materials tend to leak after prolonged exposure to debris laden environments. It is believed by the inventors of the present invention that the combination transaxial and axial seal between the seat 112, 212 and the seal 110, 210 may make the valve more tolerant to debris.

With respect to the seat 112 and 212, it will be understood by those of ordinary skill in the art that materials commonly used in the art include metals, such as high nickel alloys, stainless steels, high strength metals, or the like. Any material suitable for the valve application may be used. No special coating or surface treatment of the seat is required. It may contain any standard surface finish suitable for the particular application.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A valve assembly for controlling the flow of fluid from an inlet to an outlet comprising:
    a moveable member;
    a seal carried by the moveable member, the seal having a main body and a sealing portion, wherein the seal comprises an inner diameter face having a wedge-shaped surface;
    a valve seat disposed opposite the moveable member, the valve seat having a transaxial seat face and an axial seat face extending axially from and forming an obtuse angle with the transaxial seat face; and
    a retaining member adapted to prevent the seal and the moveable member from disengaging;
    wherein when the moveable member is in a first position, the sealing portion and retaining member are axially spaced from the valve seat; and
    wherein when the moveable member is in a second position, the sealing portion sealingly engages the transaxial seat face and the axial seat face of the valve seat and the retaining member engages the valve seat adjacent the seal such that the valve seat, retaining member and seal together function to prevent the flow of fluid from the inlet to the outlet.

2. The assembly of claim 1 wherein the sealing portion has a generally rectangular cross section.

3. The assembly of claim 1 wherein sealing portion has a surface that is generally parallel to the transaxial seat face.

4. The assembly of claim 1 wherein the sealing portion has a surface that is generally perpendicular to the transaxial seat face.

5. The assembly of claim 1 wherein the moveable member comprises a groove adapted to receive the seal.

6. The assembly of claim 1 wherein the retaining member and the moveable member together form a groove in which the seal is retained.

7. The assembly of claim 1 wherein at least part of the retaining member and at least part of the moveable member are disposed on opposite sides of the seal.

8. The assembly of claim 1 wherein the retaining member is coupled to the moveable member.

9. The assembly of claim 1 wherein tightening the retaining member with respect to the moveable member compresses the seal.

10. The assembly of claim 1 wherein the retaining member is metal.

11. The assembly of claim 1 further comprising a retaining member having a wedge-shaped portion opposite wedge-shaped surface of the seal, and the seal being retained in a groove between the retaining member and the moveable member.

12. The assembly of claim 1 wherein the seal comprises an outer diameter face having a ramp-shaped surface.

13. The assembly of claim 12 wherein at least part of the seal is frustoconical.

14. The assembly of claim 13 further comprising a retaining member having a surface adapted to mate with the frustoconical part of the seal.

15. The assembly of claim 1 wherein the seal is formed of a filled or unfilled polymeric material.

16. The assembly of claim 1 wherein the valve seat is metal.

17. The assembly of claim 1 wherein the obtuse angle ranges from 95 degrees to 135 degrees.

18. The assembly of claim 1 wherein the obtuse angle ranges from 100 to 120 degrees.

* * * * *